US010409934B1

(12) United States Patent
Grant et al.

(10) Patent No.: US 10,409,934 B1
(45) Date of Patent: Sep. 10, 2019

(54) SYSTEM, METHOD, AND COMPUTER PROGRAM PRODUCT FOR STATIC AND DYNAMIC PHASE MATCHING IN AN ELECTRONIC CIRCUIT DESIGN

(71) Applicant: Cadence Design Systems, Inc., San Jose, CA (US)

(72) Inventors: Charles Winston Grant, Leominster, MA (US); Stephen Ralph Russo, Holden, MA (US); Abhay K. Agarwal, Nashua, NH (US); Brett Allen Neal, Monument, CO (US); Joseph D. Smedley, Chelmsford, MA (US)

(73) Assignee: Cadence Design Systems, Inc., San Jose, CA (US)

( * ) Notice: Subject to any disclaimer, the term of this patent is extended or adjusted under 35 U.S.C. 154(b) by 1344 days.

(21) Appl. No.: 14/168,161

(22) Filed: Jan. 30, 2014

(51) Int. Cl.
*G06F 17/50* (2006.01)

(52) U.S. Cl.
CPC ...... *G06F 17/5022* (2013.01); *G06F 17/5068* (2013.01); *G06F 17/5077* (2013.01); *G06F 17/5081* (2013.01)

(58) Field of Classification Search
None
See application file for complete search history.

(56) References Cited

U.S. PATENT DOCUMENTS

| | | | | |
|---|---|---|---|---|
| 4,615,011 A * | 9/1986 | Linsker | ............... | G06F 17/5077 700/36 |
| 7,065,729 B1* | 6/2006 | Chapman | ............ | G06F 17/5077 716/129 |
| 7,562,330 B1 | 7/2009 | Wadland et al. | | |
| 7,761,836 B1* | 7/2010 | Wadland | ............. | G06F 17/5077 716/130 |
| 7,926,013 B2* | 4/2011 | Elikan | ................. | G06F 17/5081 716/104 |
| 8,191,032 B1 | 5/2012 | Wadland et al. | | |
| 8,549,459 B1 | 10/2013 | Wadland et al. | | |
| 8,719,746 B1* | 5/2014 | Davidovic | .......... | G06F 17/5081 716/112 |
| 8,984,449 B1* | 3/2015 | Li | ....................... | G06F 17/5081 430/30 |
| 9,563,737 B1* | 2/2017 | Arkhipov | ............ | G06F 17/5081 |
| 2004/0203809 A1* | 10/2004 | Au | ........................ | H04W 28/18 455/450 |
| 2005/0153212 A1* | 7/2005 | Lavin | ....................... | G03F 1/36 430/5 |

(Continued)

OTHER PUBLICATIONS

Mentor Graphics, "Exploring PADS PCB Design Solution, PADS Evaluation Guide" pp. 1-59, 2009.*

(Continued)

*Primary Examiner* — Kibrom K Gebresilassie
(74) *Attorney, Agent, or Firm* — Mark H. Whittenberger, Esq.; Holland & Knight LLP

(57) ABSTRACT

The present disclosure relates to a computer-implemented method for electronic design simulation. The method may include providing, at an electronic design associated with one or more computing devices, a differential pair between a driver and a receiver. The method may further include identifying one or more segments associated with the differential pair and automatically solving, using the one or more computing devices, for a dynamic phase associated with the one or more segments.

8 Claims, 16 Drawing Sheets

(56) References Cited

U.S. PATENT DOCUMENTS

| | | | |
|---|---|---|---|
| 2006/0242614 A1* | 10/2006 | Wadland | G06F 17/5077 716/122 |
| 2008/0028352 A1* | 1/2008 | Birch | G06F 17/5077 716/112 |
| 2008/0168415 A1* | 7/2008 | Staiger | G06F 17/5068 716/102 |
| 2009/0089726 A1* | 4/2009 | Heng | G06F 17/5081 716/119 |
| 2009/0172629 A1* | 7/2009 | Elikan | G06F 17/5081 716/129 |
| 2009/0268958 A1* | 10/2009 | Kwang | G06F 17/5081 382/145 |
| 2010/0014859 A1* | 1/2010 | D'Alessandro | H04J 14/0284 398/48 |
| 2011/0225561 A1* | 9/2011 | Orita | G06F 17/5077 716/131 |
| 2012/0124536 A1* | 5/2012 | Sharma | G06F 17/5081 716/112 |
| 2013/0087932 A1* | 4/2013 | Lu | H01L 27/11807 257/786 |
| 2013/0145334 A1* | 6/2013 | Nojima | G06F 17/5081 716/115 |
| 2017/0155529 A1* | 6/2017 | Aung | G11C 7/22 |

OTHER PUBLICATIONS

R. Roth "FlowCAD Webinar Constraint Manager Tips and Tricks" pp. 1-60, 2012.*

* cited by examiner

SYSTEM, METHOD, AND COMPUTER PROGRAM PRODUCT FOR STATIC AND DYNAMIC PHASE MATCHING IN AN ELECTRONIC CIRCUIT DESIGN

FIELD OF THE INVENTION

The present disclosure relates to electronic designs, and more specifically, to a method for routing in an electronic design.

DISCUSSION OF THE RELATED ART

In the world of electronic design automation ("EDA"), design rule checking ("DRC") is an area of EDA that determines whether the physical layout of a particular chip layout satisfies one or more parameters or design rules. One area of DRC focuses upon assessing potential noise and interference problems that may be associated with the design. As such, high speed PCB circuit designs may incorporate the use of Differential Pair ("DiffPair") signals in order to create more reliable signals in low power, noisy, and high speed environments.

One requirement for DiffPair signals is that they be routed to within a small increment of length matching from end to end (static phase) in order for the signals to arrive at the receiver within a short window of time (e.g., often as low as 10 ps). This is necessary so that the equal and opposite signals which characterize a DiffPair will reach the receiver so that the switching time of the positive signal will intersect with the switching time of the negative signal at the crossover point, thereby reliably signaling a change of state even in a noisy environment.

In addition, due primarily to the presence of common mode interference (i.e., noise that affects both signals comparably) static phase adjustments are not enough. A length matching design rule called "dynamic phase" attempts to match the cumulative length of the two members of the DiffPair within small tolerances at every point along the way, from driver to receiver, so that the propagation of the two signals matches at each point.

Unlike for static phase, where a single measurement can determine the amount of etch to be added or removed in order to achieve compliance, it can be very difficult for a user to interactively modify each member of the DiffPair in such a way as to reach compliance with dynamic phase tolerance. First, there is no simple measurement for the adjustments that need to be made as the amount of adjustment might be different at every corner. Secondly, each adjustment may alter the state of every subsequent corner. Therefore, a single measurement is impossible, and the user must iteratively recheck the numbers each time a new corner is added. Thirdly, due to space limitations and the potential complexity of the routing, it is often very difficult to achieve 100% compliance.

SUMMARY OF DISCLOSURE

In one or more embodiments of the present disclosure, a computer-implemented method for electronic design simulation is provided. The method may include providing, at an electronic design associated with one or more computing devices, a differential pair between a driver and a receiver. The method may also include identifying one or more segments associated with the differential pair and automatically solving, using the one or more computing devices, for a dynamic phase associated with the one or more segments.

One or more of the following features may be included. In some embodiments, the method may further include calculating a minimum amount of length violation in a contiguous area containing the one or more segments. The method may also include adding the minimum amount of length violation to a current segment and determining if the addition improved a score associated with a design rule check analysis. The method may further include solving for a static phase associated with the one or more segments. In some embodiments, solving for a static phase may include simultaneously solving for the static phase and the dynamic phase. The method may also include ignoring an overall score associated with a design rule check analysis during an iteration of the simulation.

In one or more embodiments of the present disclosure a computer-readable storage medium having stored thereon instructions, which when executed by a processor result in one or more operations for electronic design simulation. Operations may include providing, at an electronic design associated with one or more computing devices, a differential pair between a driver and a receiver. The method may also include identifying one or more segments associated with the differential pair and automatically solving, using the one or more computing devices, for a dynamic phase associated with the one or more segments.

One or more of the following features may be included. In some embodiments, operations may further include calculating a minimum amount of length violation in a contiguous area containing the one or more segments. Operations may also include adding the minimum amount of length violation to a current segment and determining if the addition improved a score associated with a design rule check analysis. Operations may further include solving for a static phase associated with the one or more segments. In some embodiments, solving for a static phase may include simultaneously solving for the static phase and the dynamic phase. Operations may also include ignoring an overall score associated with a design rule check analysis during an iteration of the simulation.

In one or more embodiments of the present disclosure, a system for electronic design is provided. The system may include one or more processors configured to provide, at an electronic design including a differential pair between a driver and a receiver. The one or more processors may be further configured to identify one or more segments associated with the differential pair and automatically solve for a dynamic phase associated with the one or more segments.

One or more of the following features may be included. In some embodiments, the one or more processors may be further configured to calculate a minimum amount of length violation in a contiguous area containing the one or more segments. The one or more processors may be further configured to add the minimum amount of length violation to a current segment and determining if the addition improved a score associated with a design rule check analysis. The one or more processors may be further configured to solve for a static phase associated with the one or more segments. In some embodiments, solving for a static phase may include simultaneously solving for the static phase and the dynamic phase.

Additional features and advantages of embodiments of the present disclosure will be set forth in the description which follows, and in part will be apparent from the description, or may be learned by practice of embodiments of the present disclosure. The objectives and other advantages of the embodiments of the present disclosure may be realized and attained by the structure particularly pointed out in the written description and claims hereof as well as the appended drawings.

It is to be understood that both the foregoing general description and the following detailed description are exemplary and explanatory and are intended to provide further explanation of embodiments of the invention as claimed.

BRIEF DESCRIPTION OF THE DRAWINGS

The accompanying drawings, which are included to provide a further understanding of embodiments of the present disclosure and are incorporated in and constitute a part of this specification, illustrate embodiments of the present disclosure and together with the description serve to explain the principles of embodiments of the present disclosure.

DETAILED DESCRIPTION

Figure 1:
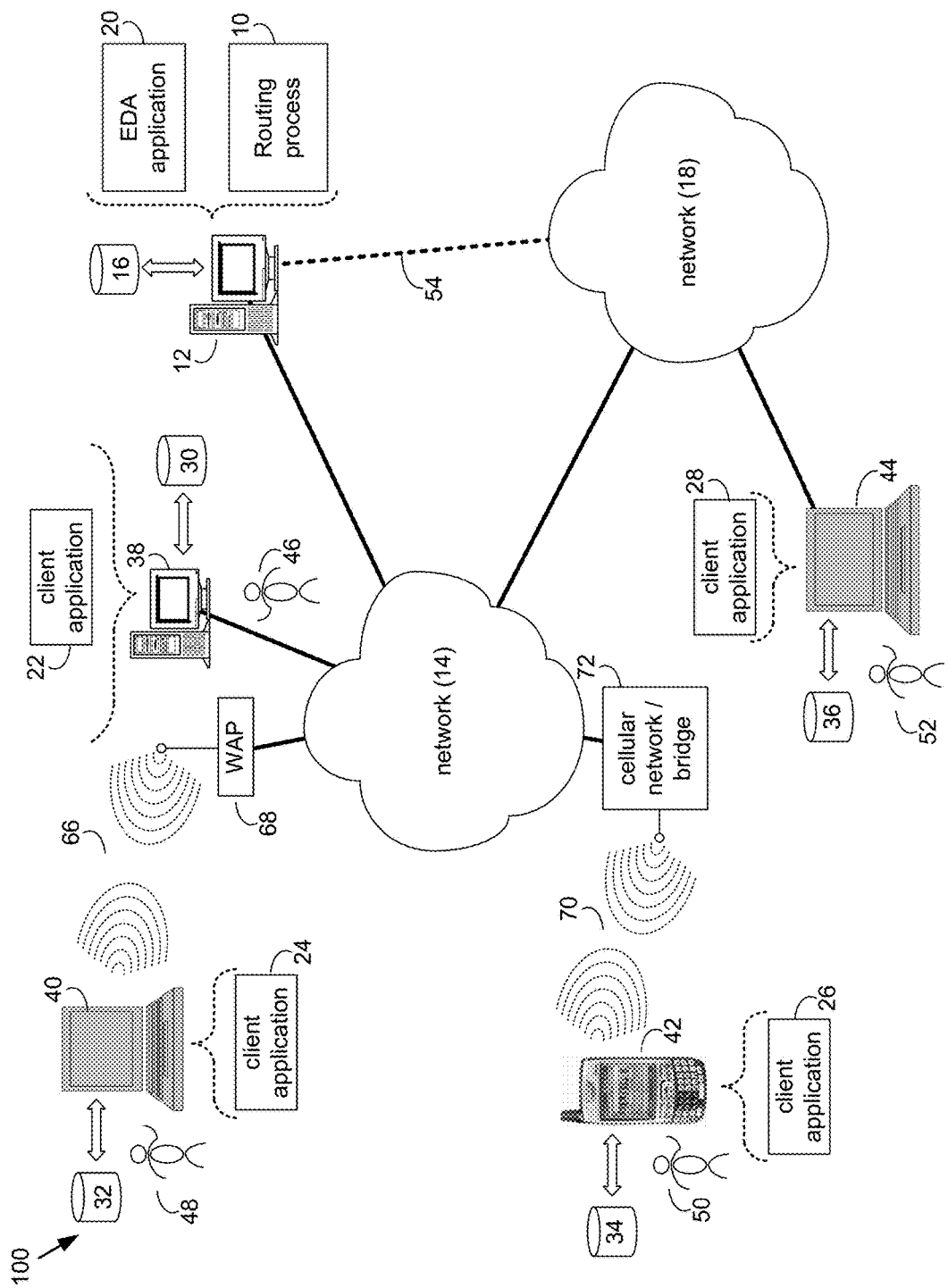
FIG. 1 is a diagram depicting an embodiment of a system in accordance with the present disclosure.

Embodiments of routing process 10 included herein may be used to automatically solve for the dynamic and static phases associated with a design rule check. The teachings of the present disclosure may be used in accordance with any electronic circuit design, including but not limited to, printed circuit board ("PCB") designs, etc.

Reference will now be made in detail to the embodiments of the present disclosure, examples of which are illustrated in the accompanying drawings. The present disclosure may, however, be embodied in many different forms and should not be construed as being limited to the embodiments set forth herein. Rather, these embodiments are provided so that this disclosure will be thorough and complete, and will fully convey the concept of the disclosure to those skilled in the art.

As will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

As used in any embodiment described herein, "circuitry" may include, for example, singly or in any combination, hardwired circuitry, programmable circuitry, state machine circuitry, and/or firmware that stores instructions executed by programmable circuitry. It should be understood at the outset that any of the operations and/or operative components described in any embodiment herein may be implemented in software, firmware, hardwired circuitry and/or any combination thereof.

Any suitable computer usable or computer readable medium may be utilized. The computer readable medium may be a computer readable signal medium or a computer readable storage medium. A computer-usable, or computer-readable, storage medium (including a storage device associated with a computing device or client electronic device) may be, for example, but not limited to, an electronic, magnetic, optical, electromagnetic, infrared, or semiconductor system, apparatus, or device, or any suitable combination of the foregoing. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device. In the context of this document, a computer-usable, or computer-readable, storage medium may be any tangible medium that can contain, or store a program for use by or in connection with the instruction execution system, apparatus, or device.

A computer readable signal medium may include a propagated data signal with computer readable program coded embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present disclosure is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

One or more hardware description languages may be used in accordance with the present disclosure. Some hardware description languages may include, but are not limited to, Verilog, VHDL, SystemC, SystemVerilog and Verilog-AMS. Various other hardware description languages may also be used as well.

Referring to FIG. 1, there is shown a routing process 10 that may reside on and may be executed by server computer 12, which may be connected to network 14 (e.g., the Internet or a local area network, etc.). Examples of server computer 12 may include, but are not limited to: a personal computer, a server computer, a series of server computers, a mini computer, and a mainframe computer. Server computer 12 may be a web server (or a series of servers) running a network operating system, examples of which may include but are not limited to: Microsoft® Windows® Server; Novell® NetWare®; or Red Hat® Linux®, for example. (Microsoft and Windows are registered trademarks of Microsoft Corporation in the United States, other countries or both; Novell and NetWare are registered trademarks of Novell Corporation in the United States, other countries or both; Red Hat is a registered trademark of Red Hat Corporation in the United States, other countries or both; and Linux is a registered trademark of Linus Torvalds in the United States, other countries or both). Additionally/alternatively, routing process 10 may reside on and be executed, in whole or in part, by a client electronic device, such as a personal computer, notebook computer, personal digital assistant, or the like.

The instruction sets and subroutines of routing process 10, which may include one or more software modules, and which may be stored on storage device 16 coupled to server computer 12, may be executed by one or more processors (not shown) and one or more memory modules (not shown) incorporated into server computer 12. Storage device 16 may include but is not limited to: a hard disk drive; a solid state drive, a tape drive; an optical drive; a RAID array; a random access memory (RAM); and a read-only memory (ROM). Storage device 16 may include various types of files and file types including but not limited, to hardware description language (HDL) files, which may contain, for example, port type descriptions and executable specifications of hardware blocks.

Server computer 12 may execute a web server application, examples of which may include but are not limited to: Microsoft IIS, Novell Webserver™, or Apache® Webserver, that allows for HTTP (i.e., HyperText Transfer Protocol) access to server computer 12 via network 14 (Webserver is a trademark of Novell Corporation in the United States, other countries, or both; and Apache is a registered trademark of Apache Software Foundation in the United States, other countries, or both). Network 14 may be connected to one or more secondary networks (e.g., network 18), examples of which may include but are not limited to: a local area network; a wide area network; or an intranet, for example.

Server computer 12 may execute an electronic design automation (EDA) application (e.g., EDA application 20), examples of which may include, but are not limited to those available from the assignee of the present application. EDA application 20 may interact with one or more EDA client applications (e.g., EDA client applications 22, 24, 26, 28) for electronic design optimization.

Routing process 10 may be a stand alone application, or may be an applet/application/script that may interact with and/or be executed within EDA application 20. In addition/ as an alternative to being a server-side process, routing process 10 may be a client-side process (not shown) that may reside on a client electronic device (described below) and may interact with an EDA client application (e.g., one or more of EDA client applications 22, 24, 26, 28). Further, routing process 10 may be a hybrid server-side/client-side process that may interact with EDA application 20 and an EDA client application (e.g., one or more of client applications 22, 24, 26, 28). As such, routing process 10 may reside, in whole, or in part, on server computer 12 and/or one or more client electronic devices.

The instruction sets and subroutines of EDA application 20, which may be stored on storage device 16 coupled to server computer 12 may be executed by one or more processors (not shown) and one or more memory modules (not shown) incorporated into server computer 12.

The instruction sets and subroutines of EDA client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory modules (not shown) incorporated into client electronic devices 38, 40, 42, 44 (respectively). Storage devices 30, 32, 34, 36 may include but are not limited to: hard disk drives; solid state drives, tape drives; optical drives; RAID arrays; random access memories (RAM); read-only memories (ROM), compact flash (CF) storage devices, secure digital (SD) storage devices, and a memory stick storage devices. Examples of client electronic devices 38, 40, 42, 44 may include, but are not limited to, personal computer 38, laptop computer 40, mobile computing device 42 (such as a smart phone, netbook, or the like), notebook computer 44, for example. Using client applications 22, 24, 26, 28, users 46, 48, 50, 52 may access EDA application 20 and may allow users to e.g., utilize routing process 10.

Users 46, 48, 50, 52 may access EDA application 20 directly through the device on which the client application (e.g., client applications 22, 24, 26, 28) is executed, namely client electronic devices 38, 40, 42, 44, for example. Users 46, 48, 50, 52 may access EDA application 20 directly through network 14 or through secondary network 18. Further, server computer 12 (i.e., the computer that executes EDA application 20) may be connected to network 14 through secondary network 18, as illustrated with phantom link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 66 established between laptop computer 40 and wireless access point (i.e., WAP) 68, which is shown directly coupled to network 14. WAP 68 may be, for example, an IEEE 802.11a, 802.11b, 802.11g, Wi-Fi, and/or Bluetooth device that is capable of establishing wireless communication channel 66 between laptop computer 40 and WAP 68. Mobile computing device 42 is shown wirelessly coupled to network 14 via wireless communication channel 70 established between mobile computing device 42 and cellular network/bridge 72, which is shown directly coupled to network 14.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

Client electronic devices 38, 40, 42, 44 may each execute an operating system, examples of which may include but are not limited to Microsoft Windows, Microsoft Windows CE®, Red Hat Linux, or other suitable operating system. (Windows CE is a registered trademark of Microsoft Corporation in the United States, other countries, or both.).

The term "design" as used herein may refer to, but is not limited to, an integrated circuit design, or any other suitable type of electronic design, such as those associated with electronic design automation tools. Numerous designs may be simulated and any number of engines of various types may be used without departing from the scope of the present disclosure.

Embodiments of routing process 10 may include a three pass algorithmic method for iterative, distributed modifications to the DiffPair tracks, which progressively improve the dynamic phase adherence of the DiffPair from the driver to the receiver. In some embodiments, the first pass may use a technique that progressively divides the areas of non-compliance into smaller pieces from driver to receiver. The second pass may ignore overall compliance and attempt to solve the remaining non-compliance one segment at a time from driver to receiver. The third pass may solve for any remaining static phase non-compliance from receiver to driver.

In some embodiments, the first pass may assess each area of non-compliance and determine the minimum out-of-spec value in each area. This iteration may then perform an equal and opposite adjustment that is enough to at least split the area of non-compliance into two or more pieces, and possibly enough to remove it. This may continue with subdividing the areas of non-compliance until either all problems are resolved or it can no longer continue without making the overall problem worse. This particular iteration may resolve large discrepancies in the length differential (e.g., in particular near the driver). The length differentials of rest of the DiffPair length differentials might fluctuate around zero and it still might have peaks and valleys that are sufficiently large to cause dynamic phase DRCs. This part of the phase differential may be solved by the second algorithm, which is discussed in further detail hereinbelow.

In this way, the second algorithm may start again from the driver and attempt to eliminate the dynamic phase errors one route segment at a time without regard to the effect on the overall score. Accordingly, this may result in solving the dynamic phase for each segment iteratively so that eventually all of the dynamic phase errors in the DiffPair are eliminated. If the dynamic phase error at a particular segment cannot be solved due to space limitations then it remains an error and the algorithm moves to the next segment. In this way, the second algorithm may clean up the peaks and valleys, and unless there isn't enough space available it will resolve the remainder of the dynamic phase errors. However, it might leave a length differential at the end that still needs to be resolved to meet static phase constraint. The final step attempts to eliminate the overall static phase differential if it can do so without causing any new dynamic phase errors.

Embodiments of routing process 10 may utilize one or more algorithms for static and dynamic phase matching. The three algorithms may each use a different set of formulas to determine the amount of adjustment to be made in the length of the shorter member of the DiffPair. Some examples of these algorithms are also illustrated in the embodiments depicted in FIGS. 2-4.

Figure 2:
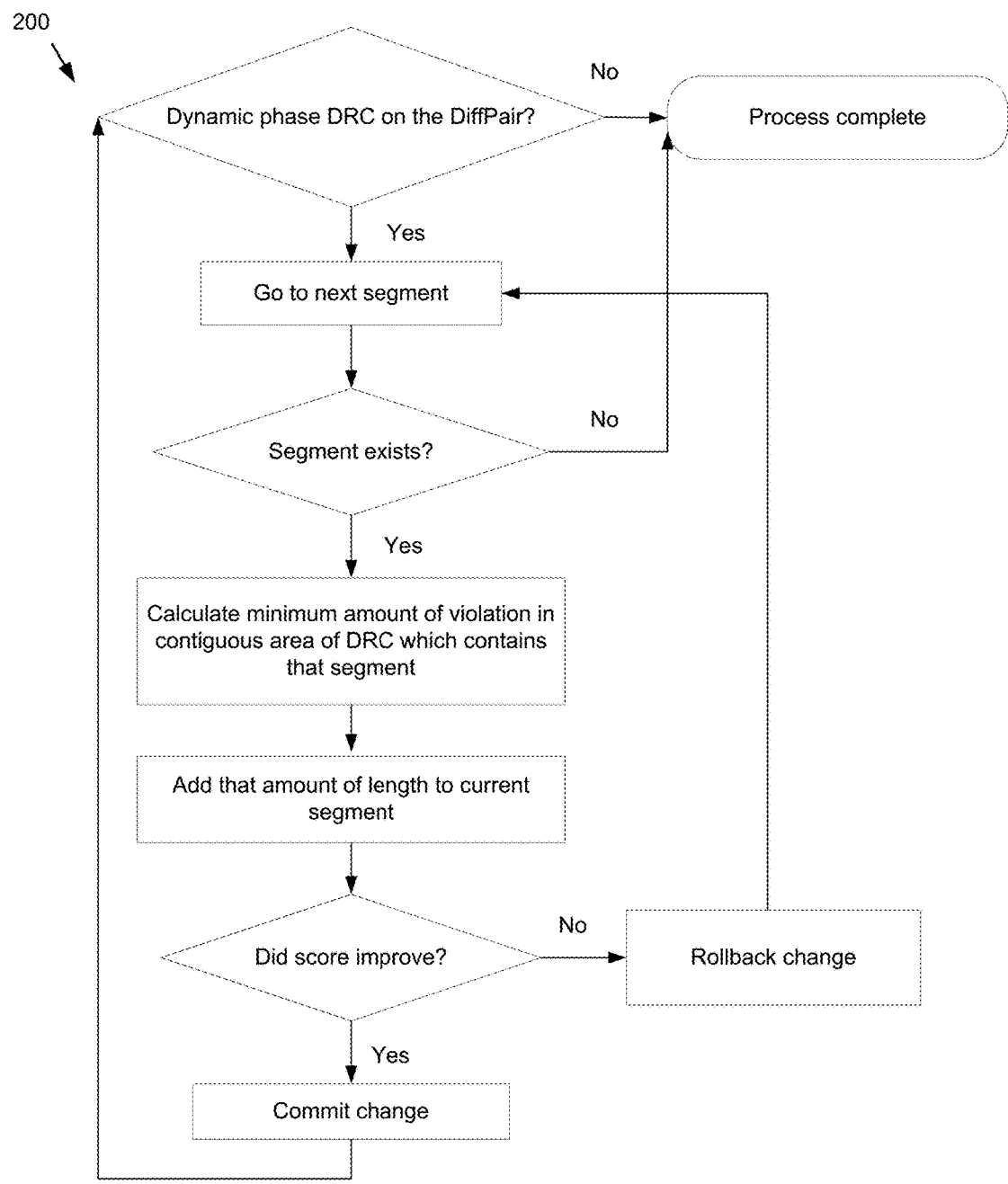
FIG. 2 is a diagram depicting an embodiment in accordance with the present disclosure.

Referring now to FIG. 2, an embodiment of routing process 10 configured to perform a global dynamic phase improvement pass is provided. In some examples, this aspect of routing process 10 may be referred to as algorithm 1. One possible example of code corresponding to this algorithm is provided below:

```
for each segment from driver to receiver of shorter DiffPair
  member {
    calculate current dynamic phase DRC status[1]
    if no DRC continue to next segment;
    else { // if DRC violation
      for contiguous area of violation {
        calculate minimum differential violation in DRC area
        add that amount of length to current segment
        verify that overall score has improved[2]
        if score improved {
          commit change
        } else { // Score did not improve
          rollback change
        }
        continue to next segment
      }
    }
  }
```

Figure 3:
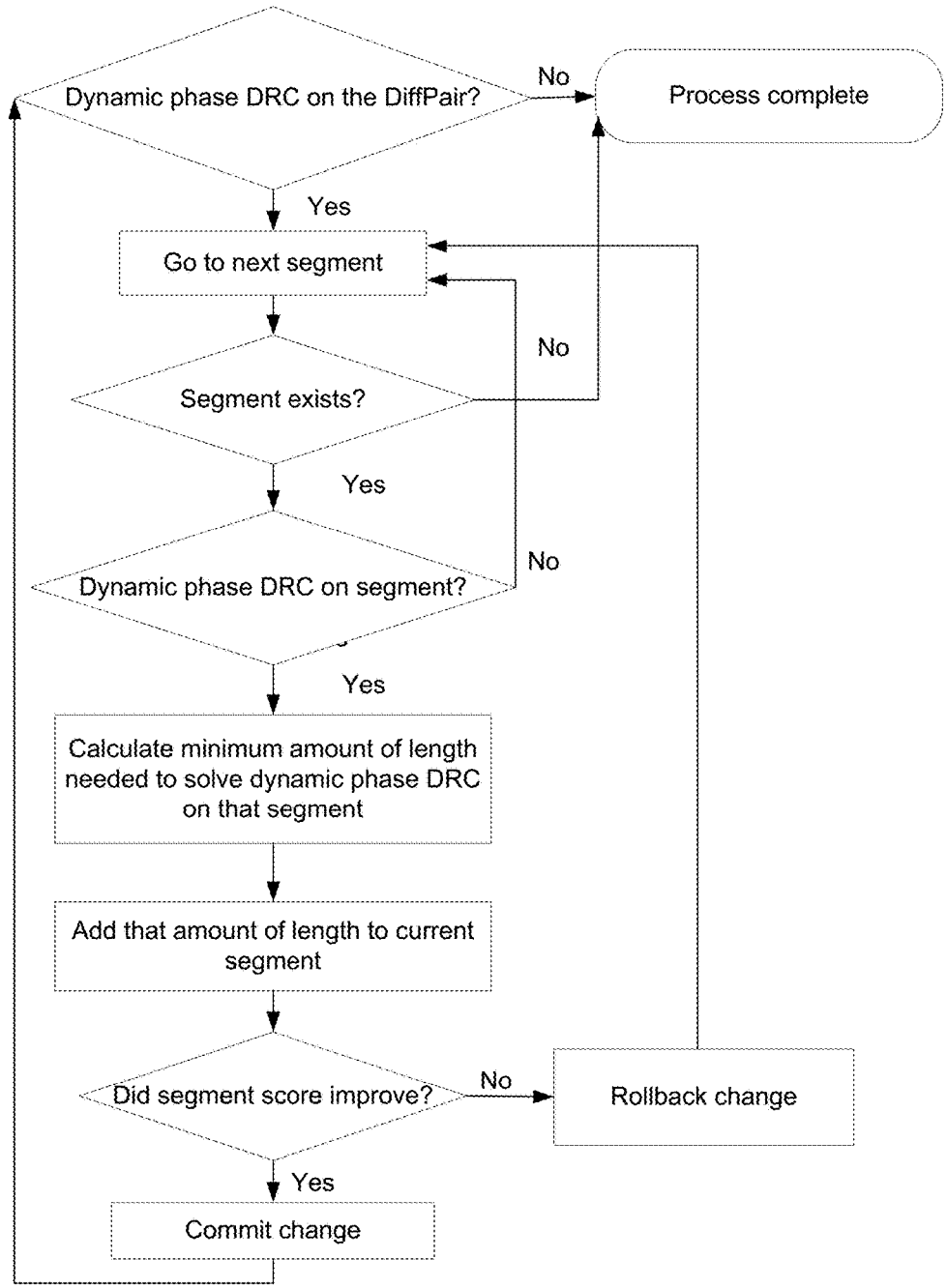
FIG. 3 is a diagram depicting an embodiment in accordance with the present disclosure.

Referring now to FIG. 3, an embodiment of routing process 10 configured to perform a local dynamic phase improvement pass is provided. In some examples, this aspect of routing process 10 may be referred to as algorithm 2. One possible example of code corresponding to this algorithm is provided below:

```
for each segment from driver to receiver of shorter DiffPair
member {
    calculate current dynamic phase DRC status
    if no DRC continue to next segment;
    else { // if DRC violation
        calculate amount needed to solve violation on that
            segment
        add that amount of length to current segment
        verify that current segment score has improved
            if segment score has improved² {
                commit change
            } else { // Segment has DRC
                rollback change
            }
        continue to next segment
    }
}
```

Figure 4:
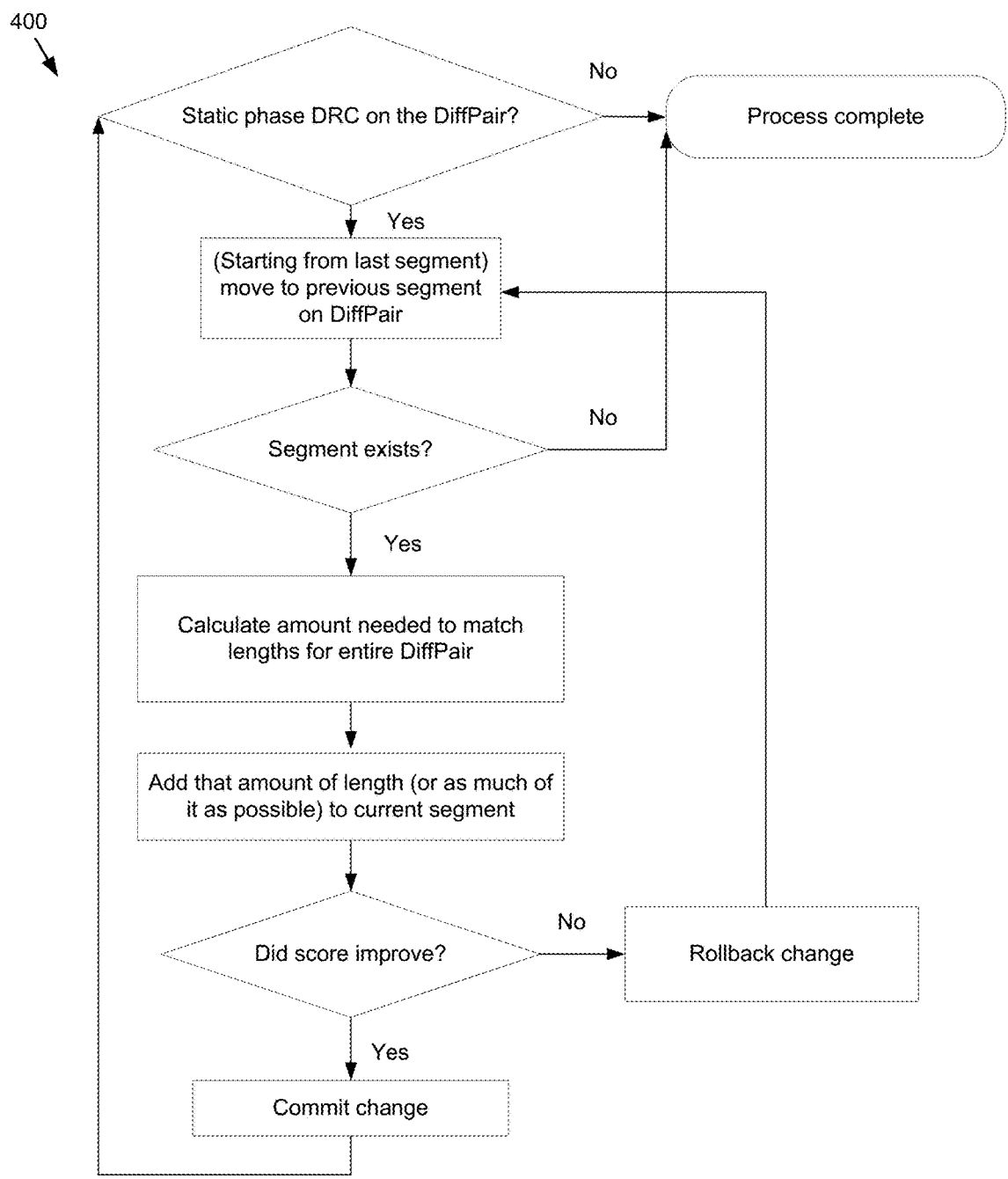
FIG. 4 is a diagram depicting an embodiment in accordance with the present disclosure.

Referring now to FIG. 4, an embodiment of routing process 10 configured to perform a static phase improvement pass is provided. In some examples, this aspect of routing process 10 may be referred to as algorithm 3. One possible example of code corresponding to this algorithm is provided below:

```
for each segment from receiver to driver of shorter
DiffPair member {
    calculate current static phase DRC status
    if no DRC break // Algorithm completed
    else { // if DRC violation
        calculate amount needed to match lengths for DiffPair
        add that amount of length to current segment
        if full amount added then break // Algorithm completed
        else add as much length as possible to that segment
        continue to next segment
    }
}
```

Embodiments of routing process 10 may utilize one or more aspects of dynamic phase DRC, which may be used as a basis for determining whether adjustments need to be made. In some embodiments, dynamic phase DRC status may be determined by calculating the length differential of the two members of the DiffPair at the corresponding location along the way from driver to receiver. If the amount of differential is greater than the dynamic phase tolerance, then there is a potential violation. Potential violations are checked to see whether the length of the track in violation is greater than the dynamic phase length tolerance. If so, there is a violation. If not then there is no violation until length tolerance is exceeded for the contiguous area in violation (see note 1 in the example algorithm discussed with reference to FIG. 2).

Figure 5:
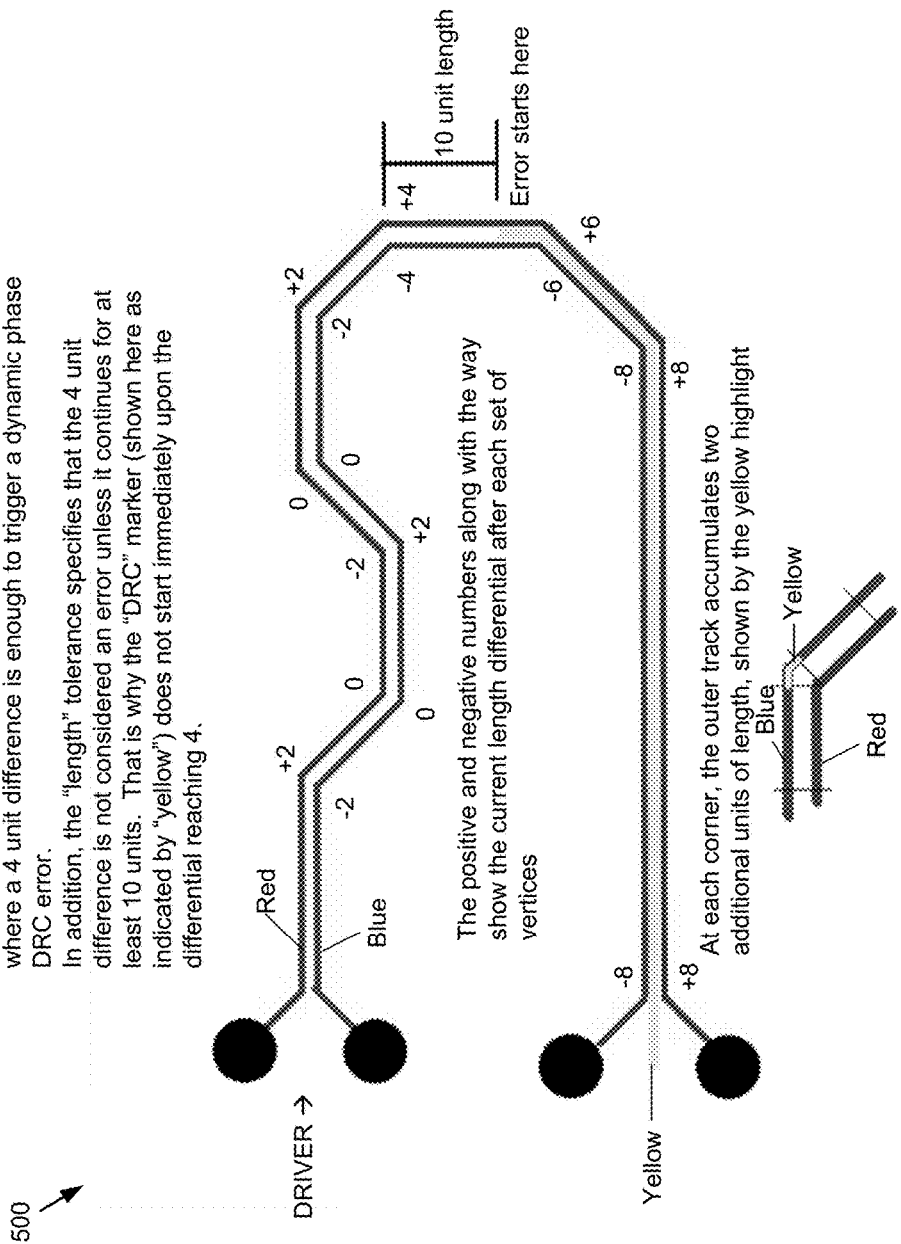
FIG. 5 is a diagram depicting an embodiment in accordance with the present disclosure.

Referring now to FIG. 5, an example of dynamic phase DRC checking is provided. Additional information may also be found in "*Allegro PCB SI: What's New in Release*", May 2011, available from the Assignee of the present disclosure, which is incorporated by reference herein in its entirety.

Figure 6:
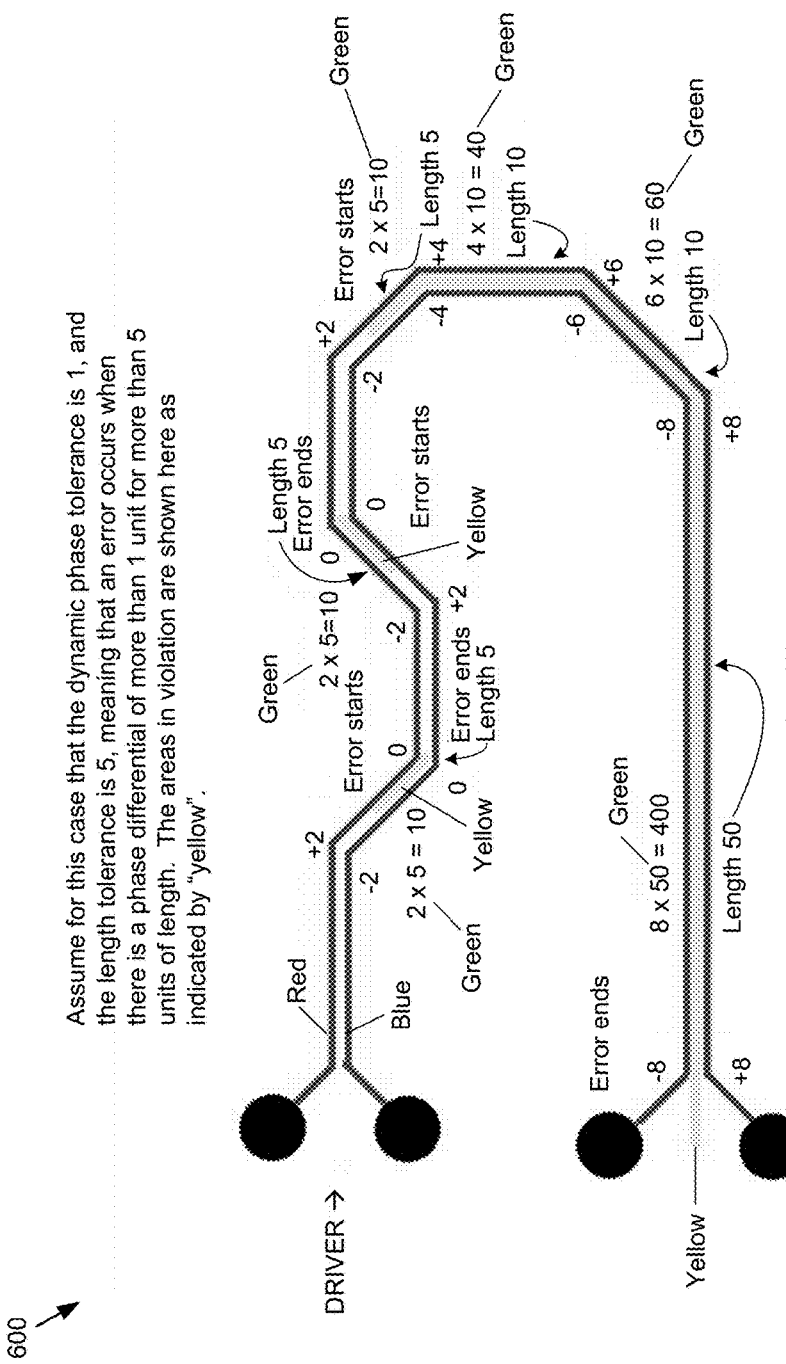
FIG. 6 is a diagram depicting an embodiment in accordance with the present disclosure.
Figure 7:
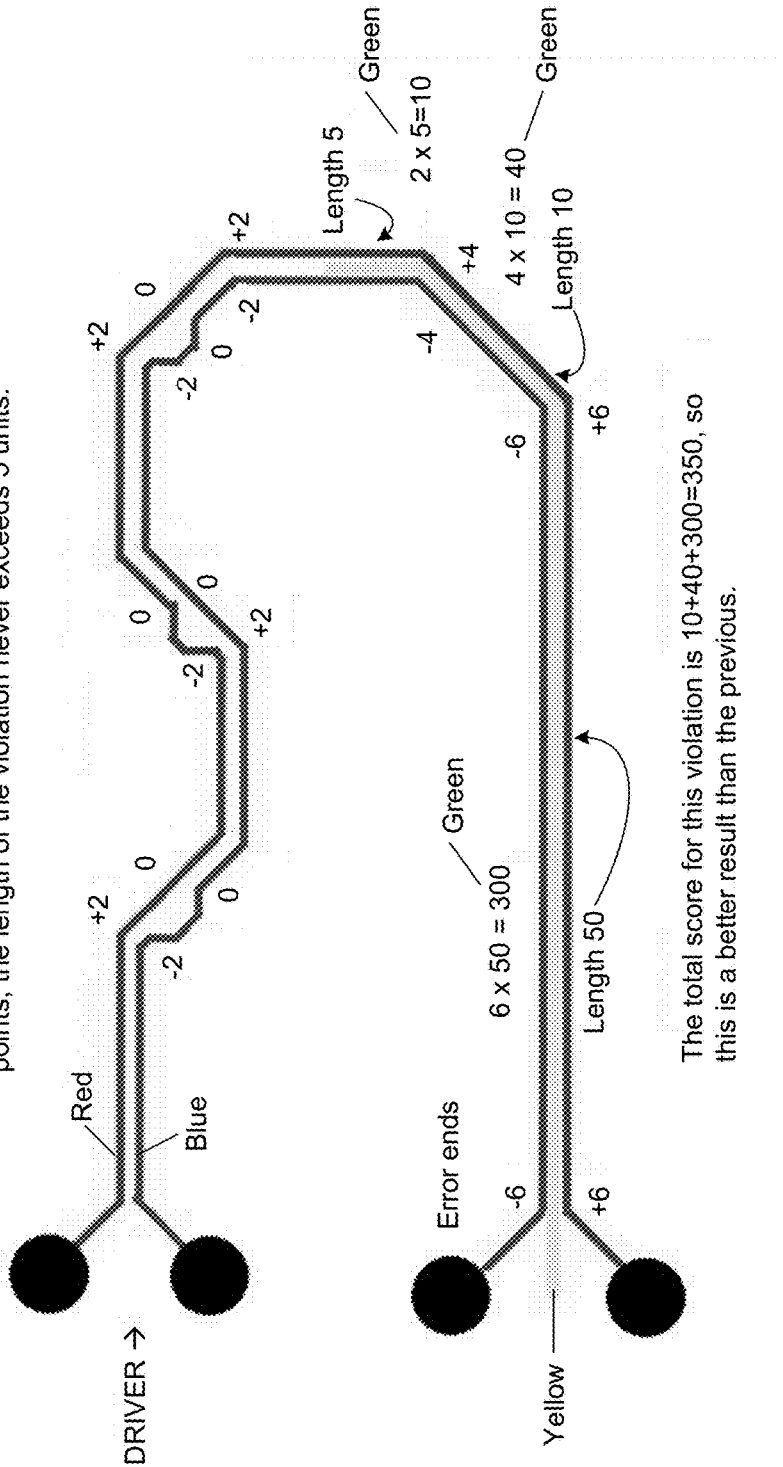
FIG. 7 is a diagram depicting an embodiment in accordance with the present disclosure.

Referring now to FIGS. 6-7, embodiments of routing process 10 may be configured to calculate a dynamic phase "score". Accordingly, the overall dynamic phase compliance score may be calculated by multiplying the length of each segment which is in dynamic phase violation with the amount of phase differential at that segment, then adding these totals together. This is done to encapsulate the quality (or lack thereof) of the violation in a pseudo-area calculation so that the length of non-compliance, and the degree of non-compliance both enter into the calculations (see note 2 in the example algorithm discussed with reference to FIG. 3).

For example, a segment which is out of phase compliance by 50 mils for a length of 1000 mils would have a score of 50000. A segment which was out of phase compliance by 50 mils for a length of 100 would have a score of 5000, meaning it is better quality and therefore this solution would be preferred. A segment which was out of phase by 500 mils for a length of 100 mils would also have a score of 50000. This gives the algorithm a way to encapsulate quality when there are two factors in play. The final score for the DiffPair as a whole may be compiled by adding all of these per segment calculations together.

Additional information regarding the concept of scoring may be found in U.S. Pat. Nos. 7,761,836, 8,191,032, 8,549,459, and 7,562,330, available from the Assignee of the present disclosure, which are each incorporated by reference herein in their entirety.

Figure 8:
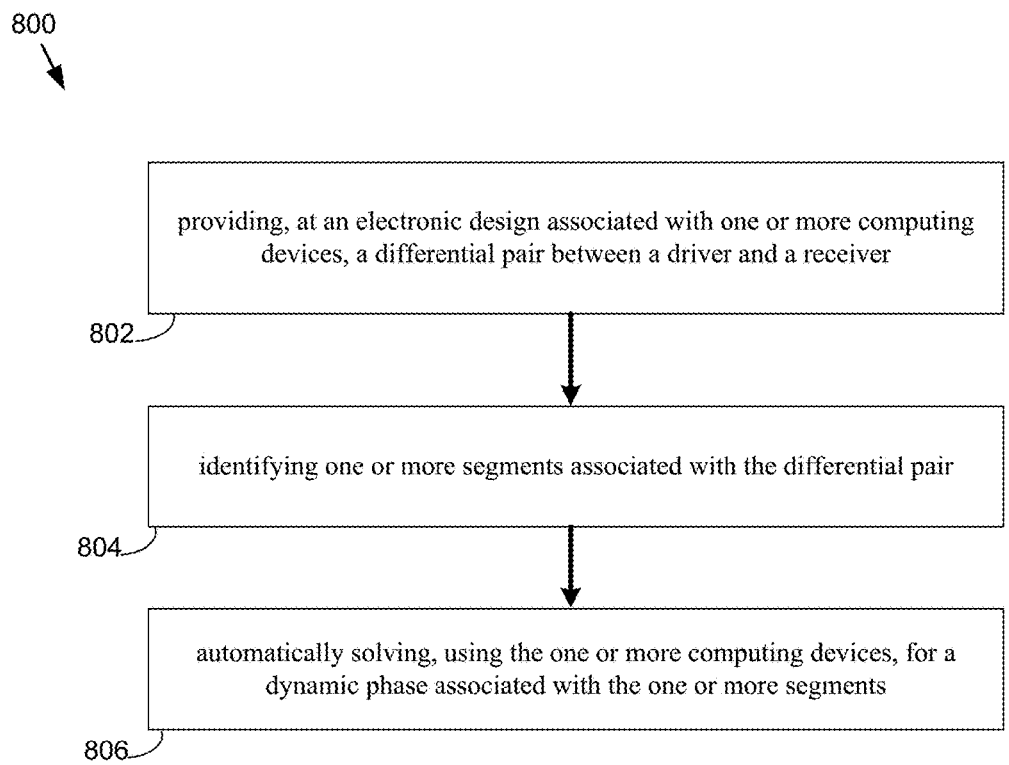
FIG. 8 is a flowchart depicting operations consistent with a routing process in accordance with an embodiment of the present disclosure.

Referring now to FIG. 8, an exemplary flowchart 800 depicting operations consistent with routing process 10 is provided. Routing process 10 may include providing (802), at an electronic design associated with one or more computing devices, a differential pair between a driver and a receiver. The method may further include identifying (804) one or more segments associated with the differential pair and automatically solving (806), using the one or more computing devices, for a dynamic phase associated with the one or more segments. Numerous other operations may also be employed without departing from the scope of the present disclosure.

Figure 9:
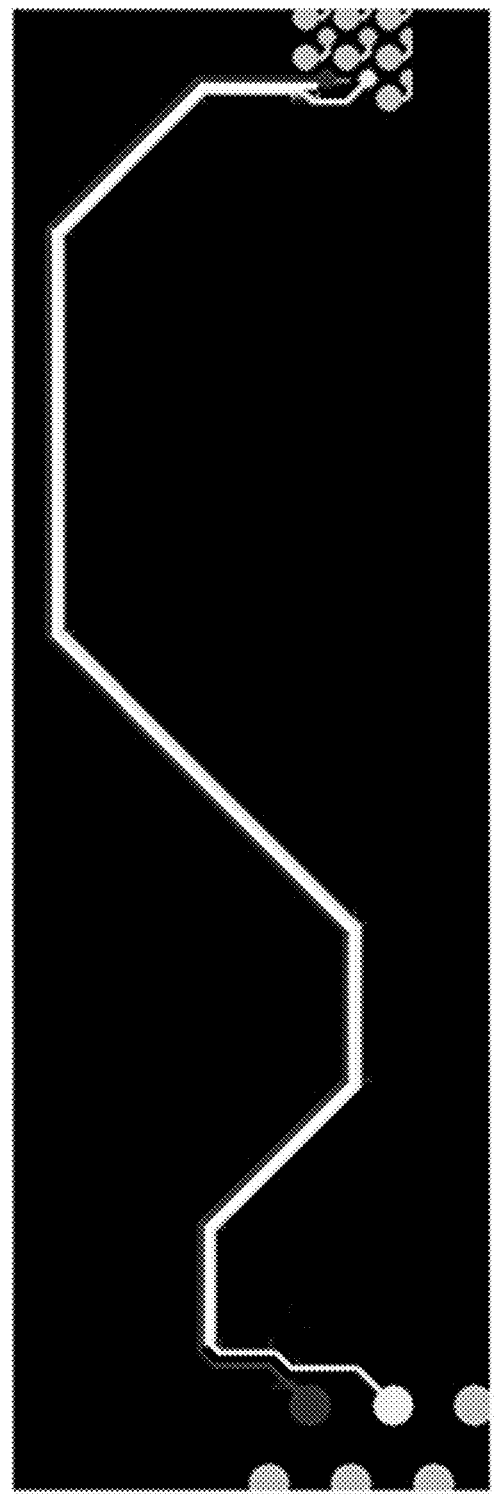
FIG. 9 is a diagram depicting an embodiment in accordance with the present disclosure.

Referring now to FIG. 9, an example 900 depicting operations that may be used to adjust dynamic and static phase is provided. In this particular embodiment, the driver is on the left and the receiver is on the right. Units are "dbunits" (10,000 per inch). In this particular embodiment, the initial state of routing before adjustments is provided. The track on the bottom is the longer path, the track on the top is the shorter path. The intermediate line located between the tracks represents the dynamic phase DRC.

Figure 10:
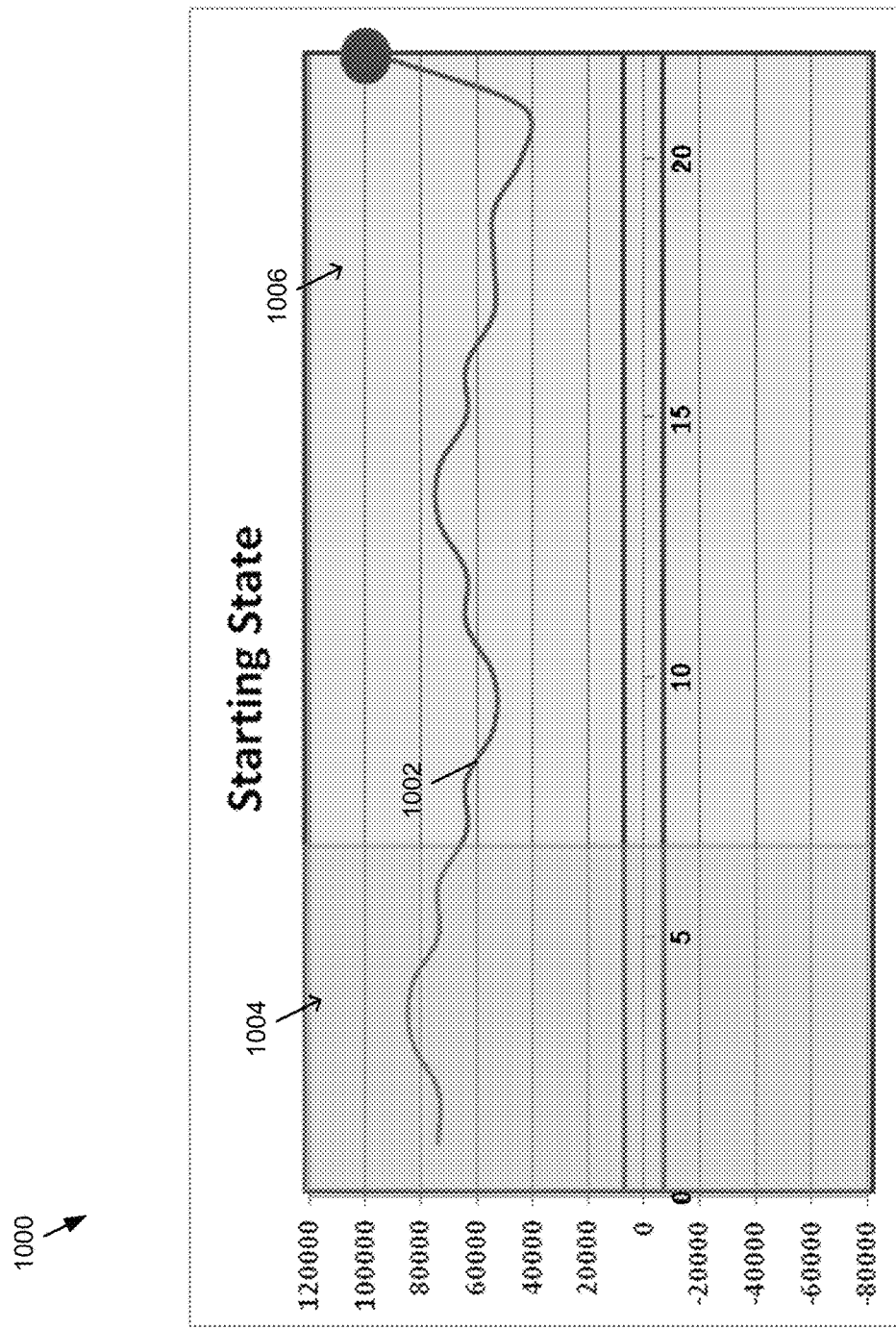
FIG. 10 is a diagram depicting an embodiment in accordance with the present disclosure.

Referring also to FIG. 10, a chart 1000 of the data depicting the length differential between the top (i.e., red) and bottom (i.e., yellow) lines is provided. In this example, the vertices are numbered from 1 to 23 (some of the extra vertices in the database occur at the 45 degree vertices where one point on the inner track corresponds to two different points on the outer track). The length differential in dbunits is depicted on the left vertical axis and the vertex number on the horizontal axis. The vertices go from left to right similarly on the board and the graph. The blue line 1002 represents the length difference above 0 for the yellow track in relation to the red track. The green area 1004 represents the portion which is not in dynamic phase violation on the left side. The red area 1006 represents the part of the track which is in violation and has the white line between the tracks. The red lines at approximately +/−2000 units represent the points at which the dynamic phase tolerance is nominally in violation, depending on whether the length tolerance has also been violated.

Referring also to Table 1, provided below, the data from FIG. 10 is provided, and in addition, contains the current length in violation of dynamic phase tolerance DRC. At vertex 8 in the chart the length in violation exceeds the dynamic phase length tolerance of 350,000 dbunits, and therefore a dynamic phase DRC occurs. The last line represents the ending length differential, equivalent to "static phase" status. In this case because the final length differential exceeds 2000 db units, the DiffPair also has a static phase DRC in addition to the dynamic phase DRCs.

TABLE 1

Static Phase tol: 2000.00 dbunits
Dyn Phase tol: 2000.00 dbunits Length tol: 350000.00 dbunits

| Vertex # | Dynamic phase status before adjustments |
|---|---|
| 1 | Diff: 73766.67 dbunits  Length: 112823.1 dbunits  DRC: No |
| 2 | Diff: 73766.67 dbunits  Length: 129482.6 dbunits  DRC: No |
| 3 | Diff: 83710.56 dbunits  Length: 139426.4 dbunits  DRC: No |
| 4 | Diff: 83710.56 dbunits  Length: 186886.4 dbunits  DRC: No |
| 5 | Diff: 73766.67 dbunits  Length: 196830.3 dbunits  DRC: No |
| 6 | Diff: 73766.67 dbunits  Length: 205315.6 dbunits  DRC: No |
| 7 | Diff: 63822.78 dbunits  Length: 215259.5 dbunits  DRC: No |
| 8 | Diff: 63822.78 dbunits  Length: 596279.5 dbunits  DRC: Yes |
| 9 | Diff: 53878.89 dbunits  Length: 606223.4 dbunits  DRC: Yes |
| 10 | Diff: 53878.89 dbunits  Length: 796421 dbunits  DRC: Yes |
| 11 | Diff: 63822.78 dbunits  Length: 806364.9 dbunits  DRC: Yes |
| 12 | Diff: 63822.78 dbunits  Length: 1510365 dbunits  DRC: Yes |
| 13 | Diff: 73766.67 dbunits  Length: 1520309 dbunits  DRC: Yes |
| 14 | Diff: 73766.67 dbunits  Length: 2065474 dbunits  DRC: Yes |
| 15 | Diff: 63822.78 dbunits  Length: 2075418 dbunits  DRC: Yes |
| 16 | Diff: 63822.78 dbunits  Length: 4305438 dbunits  DRC: Yes |
| 17 | Diff: 53878.89 dbunits  Length: 4315382 dbunits  DRC: Yes |
| 18 | Diff: 53878.89 dbunits  Length: 4317093 dbunits  DRC: Yes |
| 19 | Diff: 53878.89 dbunits  Length: 4506725 dbunits  DRC: Yes |
| 20 | Diff: 43935 dbunits  Length: 4516669 dbunits  DRC: Yes |
| 21 | Diff: 43935 dbunits  Length: 4611511 dbunits  DRC: Yes |
| 22 | Static: 96708.96 dbunits— — — DRC: Yes |

Figure 11:
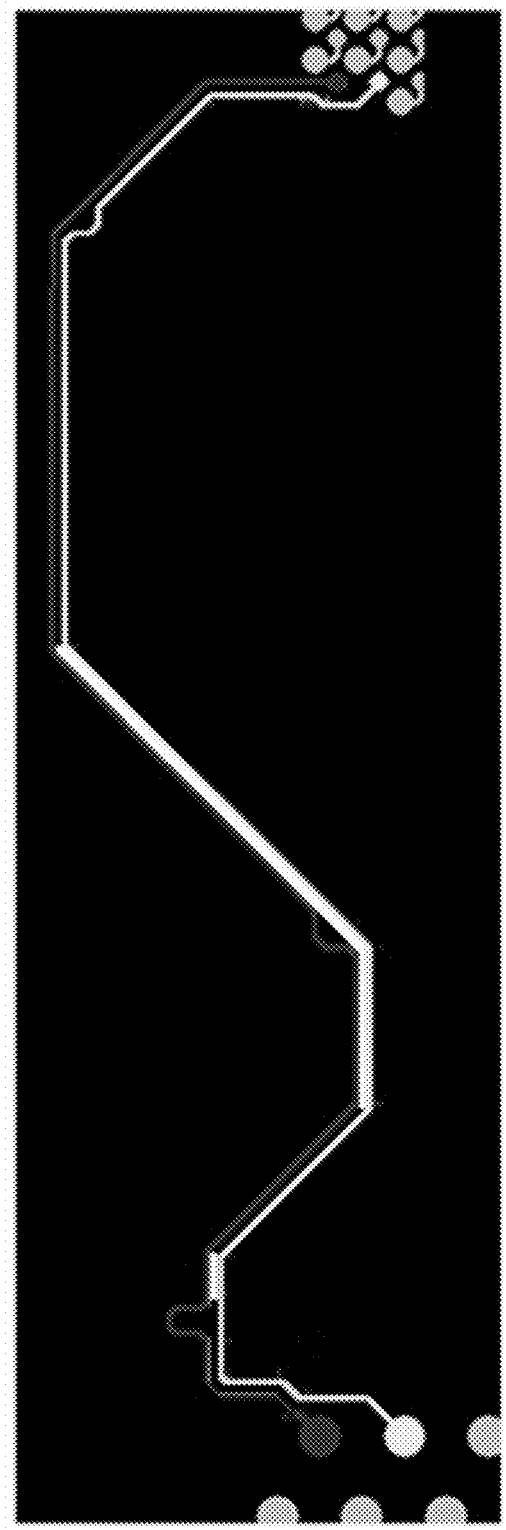
FIG. 11 is a diagram depicting an embodiment in accordance with the present disclosure.

Referring now to FIG. 11, an example 1100 depicting the state of routing adjustments after algorithm one is provided. These operations perform a global adjust that attempts to lessen the difference between the lengths of the two tracks at each point from driver to receiver by an amount equal to the minimum out-of-phase differential within the contiguous area of dynamic phase DRC in which that point is contained. Note that the previously solid dynamic phase error is now broken into two pieces. This algorithm may be configured to divide large areas of non-compliance into smaller, manageable pieces (which may be solved later using algorithm #2).

Figure 12:
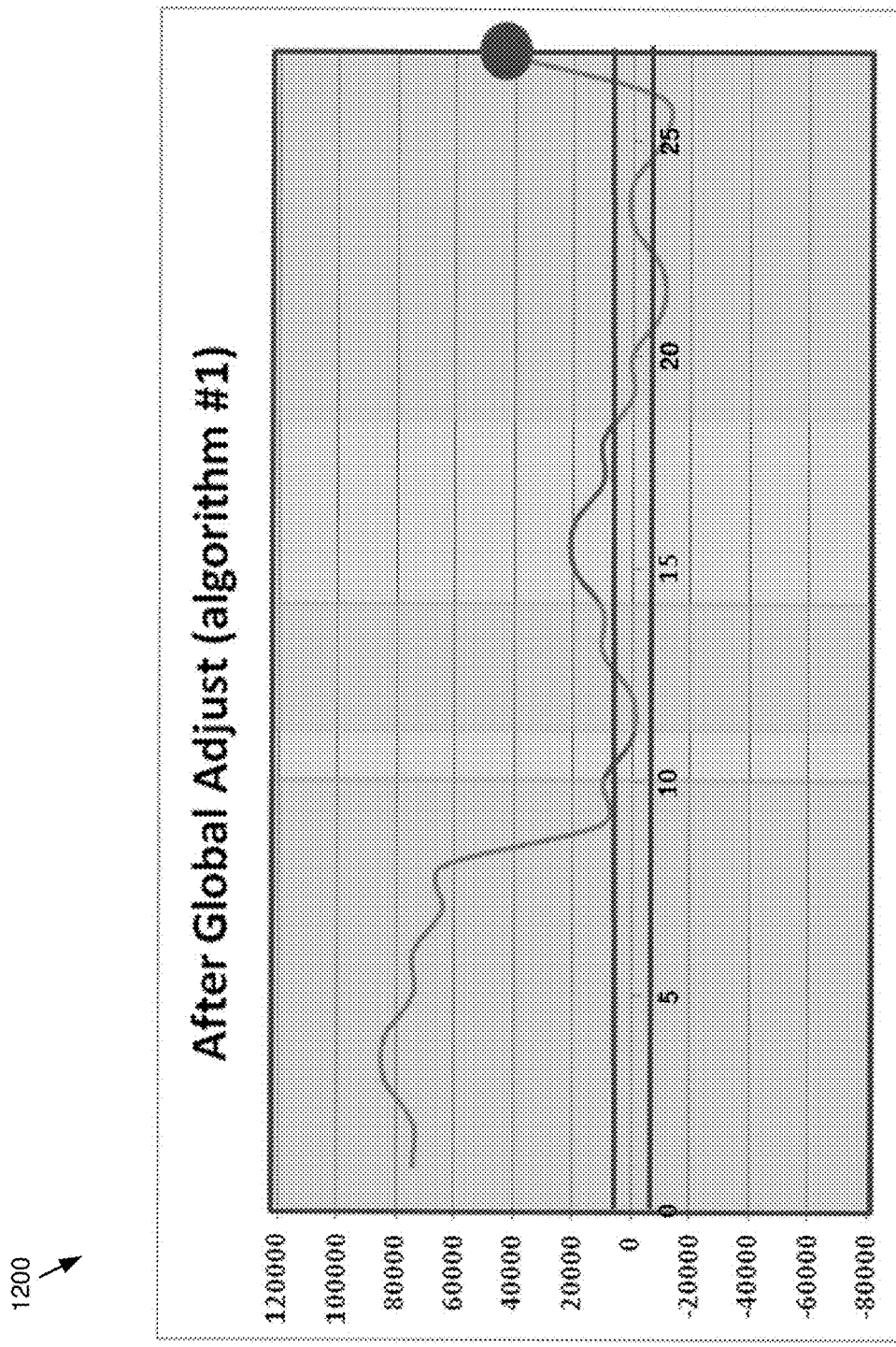
FIG. 12 is a diagram depicting an embodiment in accordance with the present disclosure.

Referring also to FIG. 12, a chart 1200 of the data after algorithm 1 is provided. In comparison with FIG. 10, the general shape of the two graphs is similar, except that there is a major adjustment where the length differential approaches zero around vertex number 9. As the algorithm continues, there are a few smaller adjustments made that push the total phase differential towards zero again. In some embodiments, this algorithm may be configured to ensure that the phase differential does not bounce into non-compliance in the negative. Accordingly, the algorithm may prevent unnecessary length from being added to either of the DiffPair members. There may be other solutions which add more length, but this is undesirable in the whole.

Referring also to Table 2, provided below, the data from FIG. 12 is provided, showing a chart of length differentials. Table 2 shows the length difference at each "event" (e.g., usually a vertex) and the amount of length for which the distance has been more than dynamic phase tolerance. When the length exceeds dynamic phase length tolerance, then the track area is in DRC violation. The last line represents the ending length differential, equivalent to "static phase" DRC.

TABLE 2

Static Phase tol: 2000.00 dbunits
Dyn Phase tol: 2000.00 dbunits Length tol: 350000.00 dbunits

| Vertex # | Dynamic phase status after global dynamic phase adjustments |
|---|---|
| 1 | Diff: 73766.67 dbunits  Length: 112823.1 dbunits  DRC: No |
| 2 | Diff: 73766.67 dbunits  Length: 129482.6 dbunits  DRC: No |
| 3 | Diff: 83710.56 dbunits  Length: 139426.4 dbunits  DRC: No |
| 4 | Diff: 83710.56 dbunits  Length: 186886.4 dbunits  DRC: No |
| 5 | Diff: 73766.67 dbunits  Length: 196830.3 dbunits  DRC: No |
| 6 | Diff: 73766.67 dbunits  Length: 205315.6 dbunits  DRC: No |
| 7 | Diff: 63822.78 dbunits  Length: 215259.5 dbunits  DRC: No |
| 8 | Diff: 63822.78 dbunits  Length: 227259.5 dbunits  DRC: No |
| 9 | Diff: 9921.66 dbunits  Length: 317160.6 dbunits  DRC: No |
| 10 | Diff: 9921.66 dbunits  Length: 650180.6 dbunits  DRC: Yes |
| 11 | Diff: −22.23 dbunits  Length: 0 dbunits  DRC: No |
| 12 | Diff: −22.23 dbunits  Length: 0 dbunits  DRC: No |
| 13 | Diff: 9921.66 dbunits  Length: 9943.89 dbunits  DRC: No |
| 14 | Diff: 9921.66 dbunits  Length: 713943.9 dbunits  DRC: Yes |
| 15 | Diff: 19865.55 dbunits  Length: 723887.8 dbunits  DRC: Yes |
| 16 | Diff: 19865.55 dbunits  Length: 735894.5 dbunits  DRC: Yes |
| 17 | Diff: 9924.75 dbunits  Length: 781827 dbunits  DRC: Yes |
| 18 | Diff: 9924.75 dbunits  Length: 1278994 dbunits  DRC: Yes |
| 19 | Diff: −19.14 dbunits  Length: 0 dbunits  DRC: No |
| 20 | Diff: −19.14 dbunits  Length: 0 dbunits  DRC: No |
| 21 | Diff: −9963.03 dbunits  Length: 9943.89 dbunits  DRC: No |
| 22 | Diff: −9963.03 dbunits  Length: 21950.56 dbunits  DRC: No |
| 23 | Diff: −22.23 dbunits  Length: 0 dbunits  DRC: No |
| 24 | Diff: −22.23 dbunits  Length: 0 dbunits  DRC: No |
| 25 | Diff: −9966.12 dbunits  Length: 9943.89 dbunits  DRC: No |
| 26 | Diff: −9966.12 dbunits  Length: 104786.4 dbunits  DRC: No |
| 27 | Static: 42807.83 dbunits— — — DRC: Yes |

Figure 13:
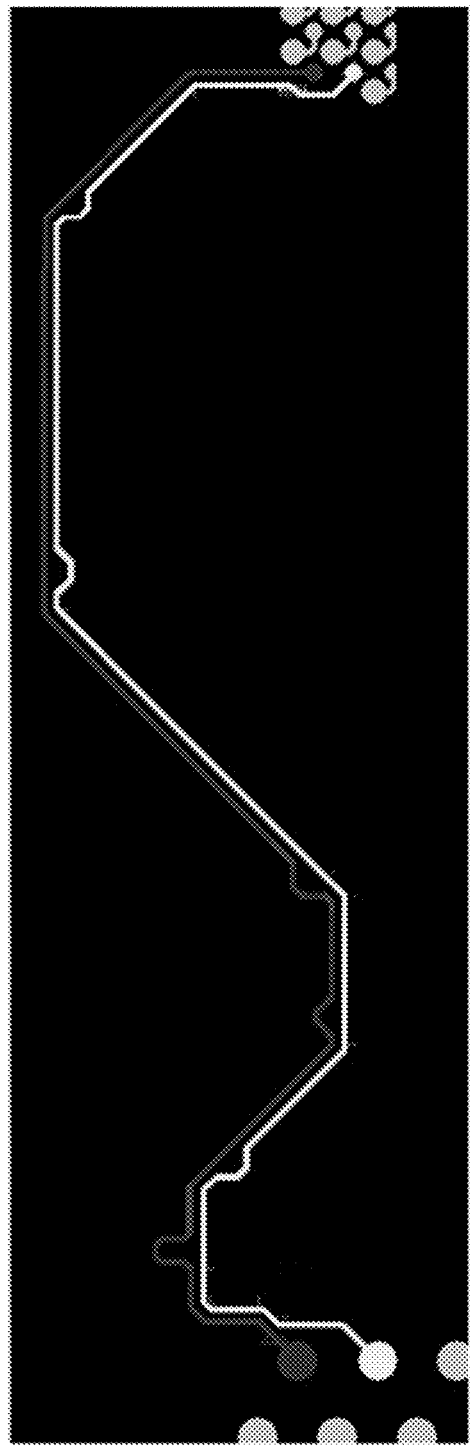
FIG. 13 is a diagram depicting an embodiment in accordance with the present disclosure.

Referring now to FIG. 13, an example 1300 depicting the results after the second set of adjustments is provided. In this particular example, all of the dynamic phase errors are eliminated. This second set of adjustments ignores the overall dynamic phase score as each bump is added, but guarantees that the score of that particular segment will be within tolerance. As the algorithm proceeds through the segments from driver to receiver it essentially combs out the violations until there are none remaining.

Figure 14:
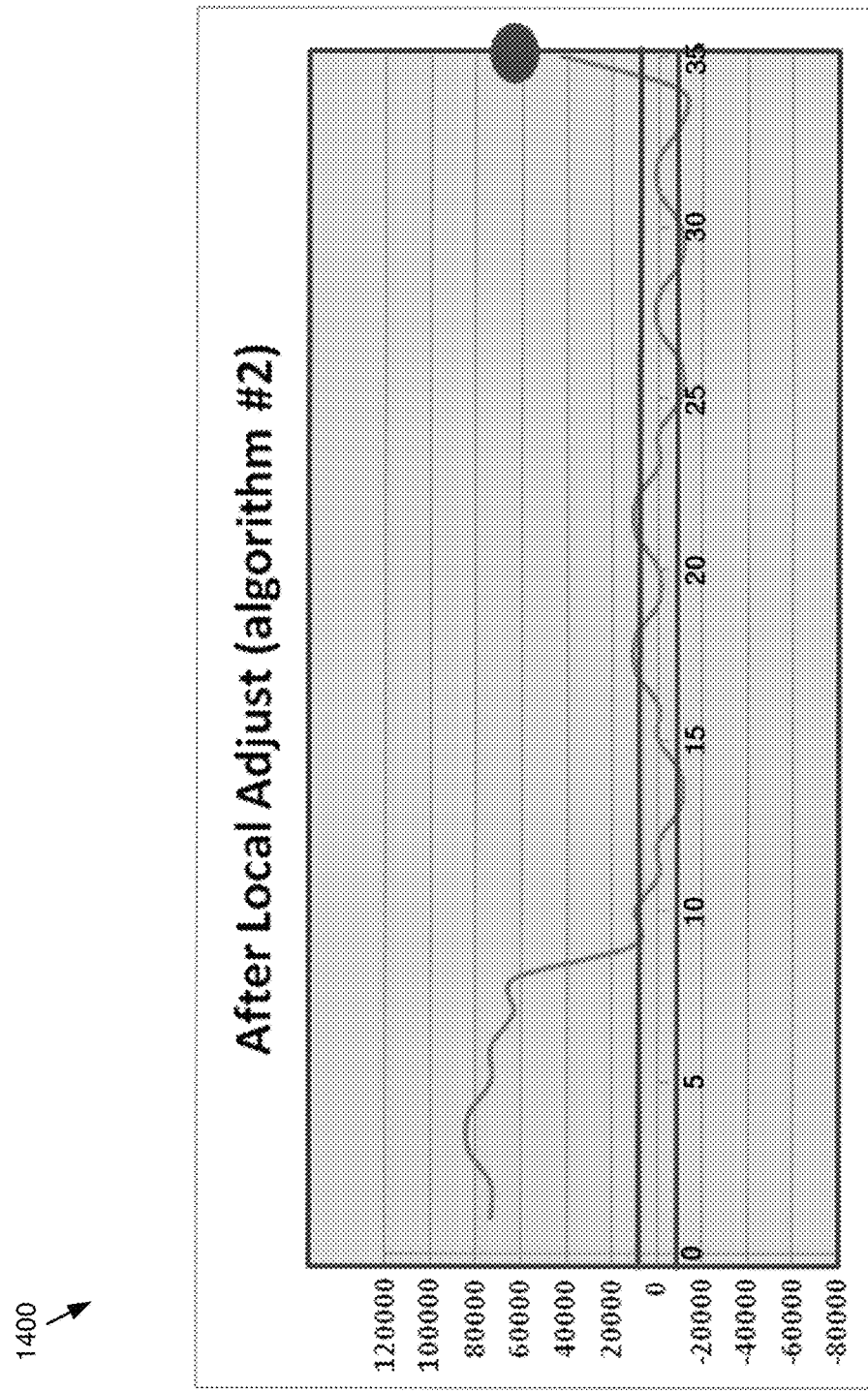
FIG. 14 is a diagram depicting an embodiment in accordance with the present disclosure.

Referring also to FIG. 14, a chart 1400 of the data after algorithm 2 is provided. As shown in FIG. 14, this set of algorithms may significantly alter the shape of the curve, pushing it towards the non-violation section enough to insure that there are no more dynamic phase violations. However, it does not attempt to solve static phase (i.e. the last point, which is still out of compliance).

Referring also to Table 3, provided below, the data from FIG. 14 is provided, showing a chart of length differentials. Table 3 shows the length difference at each "event" (usually a vertex) and the amount of length for which the distance has been more than dynamic phase tolerance. When the length exceeds dynamic phase length tolerance, then the track area is in DRC violation. The last line represents the ending length differential, equivalent to "static phase" DRC.

TABLE 3

Static Phase tol: 2000.00 dbunits
Dyn Phase tol: 2000.00 dbunits Length tol: 350000.00 dbunits

| Vertex # | Dynamic phase status after local dynamic phase adjustments |
|---|---|
| 1 | Diff: 73766.67 dbunits  Length: 112823.1 dbunits  DRC: No |
| 2 | Diff: 73766.67 dbunits  Length: 129482.6 dbunits  DRC: No |
| 3 | Diff: 83710.56 dbunits  Length: 139426.4 dbunits  DRC: No |
| 4 | Diff: 83710.56 dbunits  Length: 186886.4 dbunits  DRC: No |
| 5 | Diff: 73766.67 dbunits  Length: 196830.3 dbunits  DRC: No |

TABLE 3-continued

Static Phase tol: 2000.00 dbunits
Dyn Phase tol: 2000.00 dbunits Length tol: 350000.00 dbunits

| Vertex # | Dynamic phase status after local dynamic phase adjustments | | |
|---|---|---|---|
| 6 | Diff: 73766.67 dbunits | Length: 205315.6 dbunits | DRC: No |
| 7 | Diff: 63822.78 dbunits | Length: 215259.5 dbunits | DRC: No |
| 8 | Diff: 63822.78 dbunits | Length: 227259.5 dbunits | DRC: No |
| 9 | Diff: 9921.66 dbunits | Length: 317160.6 dbunits | DRC: No |
| 10 | Diff: 9921.66 dbunits | Length: 329160.6 dbunits | DRC: No |
| 11 | Diff: −19.47 dbunits | Length: 0 dbunits | DRC: No |
| 12 | Diff: −19.47 dbunits | Length: 0 dbunits | DRC: No |
| 13 | Diff: −9963.36 dbunits | Length: 9943.89 dbunits | DRC: No |
| 14 | Diff: −9963.36 dbunits | Length: 21950.56 dbunits | DRC: No |
| 15 | Diff: −22.56 dbunits | Length: 0 dbunits | DRC: No |
| 16 | Diff: −22.56 dbunits | Length: 0 dbunits | DRC: No |
| 17 | Diff: 9921.33 dbunits | Length: 9943.89 dbunits | DRC: No |
| 18 | Diff: 9921.33 dbunits | Length: 21943.89 dbunits | DRC: No |
| 19 | Diff: −19.8 dbunits | Length: 0 dbunits | DRC: No |
| 20 | Diff: −19.8 dbunits | Length: 0 dbunits | DRC: No |
| 21 | Diff: 9924.09 dbunits | Length: 9943.89 dbunits | DRC: No |
| 22 | Diff: 9924.09 dbunits | Length: 21950.56 dbunits | DRC: No |
| 23 | Diff: −16.7 dbunits | Length: 0 dbunits | DRC: No |
| 24 | Diff: −16.7 dbunits | Length: 0 dbunits | DRC: No |
| 25 | Diff: −9960.59 dbunits | Length: 9943.89 dbunits | DRC: No |
| 26 | Diff: −9960.59 dbunits | Length: 21943.89 dbunits | DRC: No |
| 27 | Diff: −19.47 dbunits | Length: 0 dbunits | DRC: No |
| 28 | Diff: −19.47 dbunits | Length: 0 dbunits | DRC: No |
| 29 | Diff: −9963.36 dbunits | Length: 9943.89 dbunits | DRC: No |
| 30 | Diff: −9963.36 dbunits | Length: 21950.56 dbunits | DRC: No |
| 31 | Diff: −22.56 dbunits | Length: 0 dbunits | DRC: No |
| 32 | Diff: −22.56 dbunits | Length: 0 dbunits | DRC: No |
| 33 | Diff: −9966.45 dbunits | Length: 9943.89 dbunits | DRC: No |
| 34 | Diff: −9966.45 dbunits | Length: 104786.4 dbunits | DRC: No |
| 35 | Static: 42807.5 dbunits | — — — | DRC: Yes |

Figure 15:
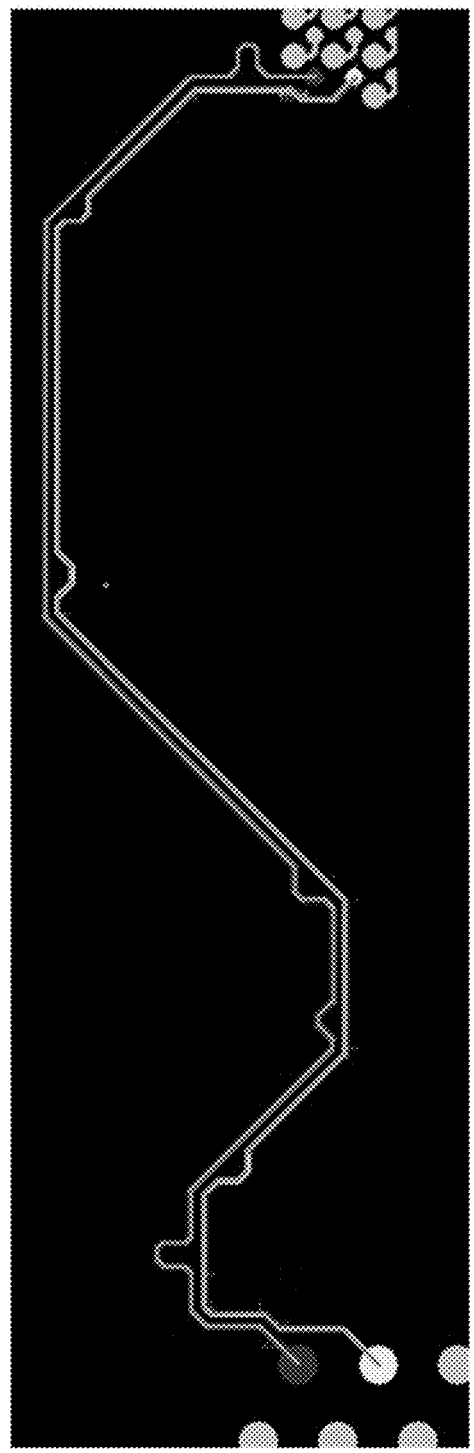
FIG. 15 is a diagram depicting an embodiment in accordance with the present disclosure.

Referring now to FIG. 15, an example 1500 depicting the results after the final set of adjustments is provided. In this particular example, the final adjustment adds length to the longer DiffPair member near enough to the receiver to solve static phase for the DiffPair without causing a dynamic phase violation anywhere along the way.

Figure 16:
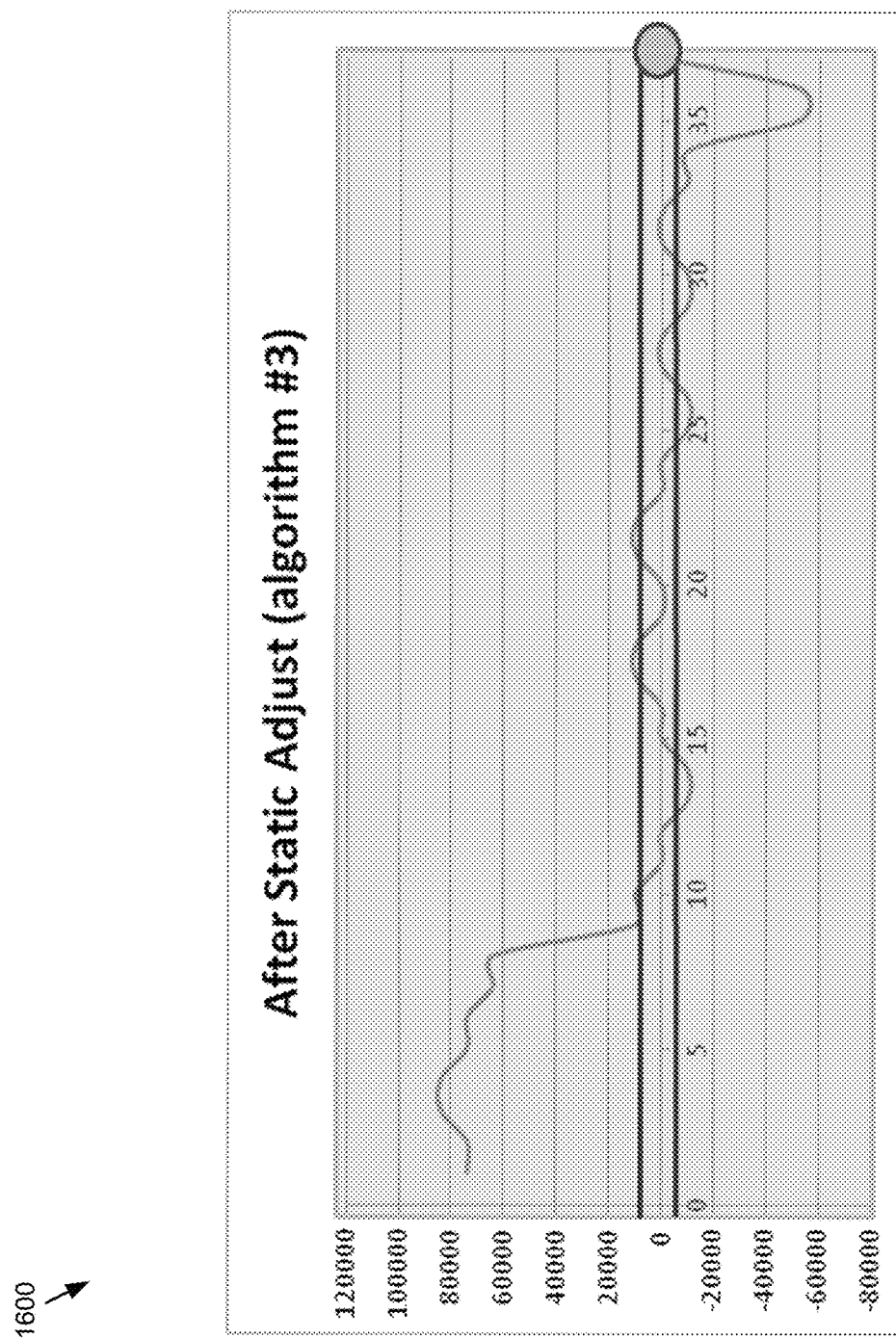
FIG. 16 is a diagram depicting an embodiment in accordance with the present disclosure.

Referring also to FIG. 16, a chart 1600 of the data after the final algorithm is provided. As shown in FIG. 16, the graph is unaltered except at the end, where a final adjustment is made to get the final length totals within static phase DRC specifications. Note, that in this particular example, after the static phase adjustment it temporarily goes far out of dynamic phase tolerance just before the end. This is permissible because the length of the violation does not exceed the dynamic phase length tolerance.

Referring also to Table 4, provided below, the data from FIG. 16 is provided, showing a chart of length differentials. Table 4 shows a chart of the final length differentials.

TABLE 4

Static Phase tol: 2000.00 dbunits
Dyn Phase tol: 2000.00 dbunits Length tol: 350000.00 dbunits

| Vertex # | Dynamic phase status after static phase adjustments | | |
|---|---|---|---|
| 1 | Diff: 73766.67 dbunits | Length: 112823.1 dbunits | DRC: No |
| 2 | Diff: 73766.67 dbunits | Length: 129482.6 dbunits | DRC: No |
| 3 | Diff: 83710.56 dbunits | Length: 139426.4 dbunits | DRC: No |
| 4 | Diff: 83710.56 dbunits | Length: 186886.4 dbunits | DRC: No |
| 5 | Diff: 73766.67 dbunits | Length: 196830.3 dbunits | DRC: No |
| 6 | Diff: 73766.67 dbunits | Length: 205315.6 dbunits | DRC: No |
| 7 | Diff: 63822.78 dbunits | Length: 215259.5 dbunits | DRC: No |
| 8 | Diff: 63822.78 dbunits | Length: 227259.5 dbunits | DRC: No |
| 9 | Diff: 9921.66 dbunits | Length: 317160.6 dbunits | DRC: No |
| 10 | Diff: 9921.66 dbunits | Length: 329160.6 dbunits | DRC: No |

TABLE 4-continued

Static Phase tol: 2000.00 dbunits
Dyn Phase tol: 2000.00 dbunits Length tol: 350000.00 dbunits

| Vertex # | Dynamic phase status after static phase adjustments | | |
|---|---|---|---|
| 11 | Diff: −19.47 dbunits | Length: 0 dbunits | DRC: No |
| 12 | Diff: −19.47 dbunits | Length: 0 dbunits | DRC: No |
| 13 | Diff: −9963.36 dbunits | Length: 9943.89 dbunits | DRC: No |
| 14 | Diff: −9963.36 dbunits | Length: 21950.56 dbunits | DRC: No |
| 15 | Diff: −22.56 dbunits | Length: 0 dbunits | DRC: No |
| 16 | Diff: −22.56 dbunits | Length: 0 dbunits | DRC: No |
| 17 | Diff: 9921.33 dbunits | Length: 9943.89 dbunits | DRC: No |
| 18 | Diff: 9921.33 dbunits | Length: 21943.89 dbunits | DRC: No |
| 19 | Diff: −19.8 dbunits | Length: 0 dbunits | DRC: No |
| 20 | Diff: −19.8 dbunits | Length: 0 dbunits | DRC: No |
| 21 | Diff: 9924.09 dbunits | Length: 9943.89 dbunits | DRC: No |
| 22 | Diff: 9924.09 dbunits | Length: 21950.56 dbunits | DRC: No |
| 23 | Diff: −16.7 dbunits | Length: 0 dbunits | DRC: No |
| 24 | Diff: −16.7 dbunits | Length: 0 dbunits | DRC: No |
| 25 | Diff: −9960.59 dbunits | Length: 9943.89 dbunits | DRC: No |
| 26 | Diff: −9960.59 dbunits | Length: 21943.89 dbunits | DRC: No |
| 27 | Diff: −19.47 dbunits | Length: 0 dbunits | DRC: No |
| 28 | Diff: −19.47 dbunits | Length: 0 dbunits | DRC: No |
| 29 | Diff: −9963.36 dbunits | Length: 9943.89 dbunits | DRC: No |
| 30 | Diff: −9963.36 dbunits | Length: 21950.56 dbunits | DRC: No |
| 31 | Diff: −22.56 dbunits | Length: 0 dbunits | DRC: No |
| 32 | Diff: −22.56 dbunits | Length: 0 dbunits | DRC: No |
| 33 | Diff: −9966.45 dbunits | Length: 9943.89 dbunits | DRC: No |
| 34 | Diff: −9966.45 dbunits | Length: 46673.89 dbunits | DRC: No |
| 35 | Diff: −52787.6 dbunits | Length: 142927.6 dbunits | DRC: No |
| 36 | Diff: −52787.6 dbunits | Length: 147607.6 dbunits | DRC: No |
| 37 | Static: −13.63 dbunits | — — — | DRC: No |

Embodiments of routing process 10 may be used to automatically solve for the dynamic phase DRC. Accordingly, routing process 10 may allow the user to automatically solve for both dynamic and static phase for multiple DiffPair signals simultaneously, for a single DiffPair, or for a selection of segments. In this way, the user may select the sizes and shapes of the compensation bumps, and routing process 10 may automatically select the best size from the range provided. It is very difficult to manually calculate the correct size bump to compensate for dynamic phase in particular. Routing process 10 may alleviate the need for the designer to manually calculate the bumps sizes, while still giving the designer the flexibility to interactively have the algorithm add bumps where desired.

In some embodiments, routing process 10 may include adding a length equal to no more than the minimum amplitude of the area in violation during the first pass. Routing process 10 may also be configured to ignore the overall score while adding only enough length to solve the violation during the second pass.

It will be apparent to those skilled in the art that various modifications and variations can be made in the embodiments of the present disclosure without departing from the spirit or scope of the present disclosure. Thus, it is intended that embodiments of the present disclosure cover the modifications and variations provided they come within the scope of the appended claims and their equivalents.

What is claimed is:

1. A computer-implemented method for improved static and dynamic phase matching to satisfy a design rule check and improve routing in a printed circuit board ("PCB") circuit design comprising:
   providing, at an electronic design associated with one or more computing devices, a differential pair between a driver and a receiver;
   identifying one or more segments associated with the differential pair;

calculating a minimum amount of length violation in a contiguous area containing the one or more segments;

adding the minimum amount of length violation to a current segment, wherein the minimum amount of length is not more than a minimum amplitude; and automatically solving, using the one or more computing devices, for a dynamic phase associated with the one or more segments while solving for a static phase associated with the one or more segments, wherein solving is based upon, at least in part, the calculating.

2. The computer-implemented method of claim 1, further comprising:

determining if adding improved a score associated with a design rule check analysis.

3. The computer-implemented method of claim 1, further comprising:

ignoring an overall score associated with a design rule check analysis during an iteration of the simulation.

4. A non-transitory computer-readable storage medium for improved static and dynamic phase matching to satisfy a design rule check and improve routing in a printed circuit board ("PCB") circuit design, the computer-readable storage medium having stored thereon instructions that when executed by a machine result in one or more operations, the operations comprising:

providing, at an electronic design associated with one or more computing devices, a differential pair between a driver and a receiver;

identifying one or more segments associated with the differential pair;

calculating a minimum amount of length violation in a contiguous area containing the one or more segments;

adding the minimum amount of length violation to a current segment, wherein the minimum amount of length is not more than a minimum amplitude; and automatically solving, using the one or more computing devices, for a dynamic phase associated with the one or more segments while solving for a static phase associated with the one or more segments, wherein solving is based upon, at least in part, the calculating.

5. The computer-readable storage medium of claim 4, further comprising:

determining if adding improved a score associated with a design rule check analysis.

6. The computer-readable storage medium of claim 4, further comprising:

ignoring an overall score associated with a design rule check analysis during an iteration of the simulation.

7. A system for improved static and dynamic phase matching to satisfy a design rule check and improve routing in a printed circuit board ("PCB") circuit design comprising:

one or more processors configured to provide an electronic design having a differential pair between a driver and a receiver, the one or more processors further configured to identify one or more segments associated with the differential pair, the one or more processors further configured to calculate a minimum amount of length violation in a contiguous area containing the one or more segments and to add the minimum amount of length violation to a current segment, wherein the minimum amount of length is not more than a minimum amplitude, the one or more processors further configured to automatically solving, using the one or more computing devices, for a dynamic phase associated with the one or more segments while solving for a static phase associated with the one or more segments, wherein solving is based upon, at least in part, the calculating.

8. The system of claim 7, wherein the one or more processors are further configured to determine if adding improved a score associated with a design rule check analysis.

* * * * *